United States Patent [19]
Holcomb

[11] Patent Number: 5,001,973
[45] Date of Patent: Mar. 26, 1991

[54] WATER-POWERED PEELER

[75] Inventor: David A. Holcomb, Seattle, Wash.

[73] Assignee: Chef'N Corporation, Seattle, Wash.

[21] Appl. No.: 412,884

[22] Filed: Sep. 26, 1989

[51] Int. Cl.⁵ .............................................. A47J 17/14
[52] U.S. Cl. .......................................... 99/593; 15/29;
30/123.3; 99/588
[58] Field of Search ................... 99/584, 588, 590–593;
30/123, 123.3, 124, 276; 15/29

[56] References Cited

U.S. PATENT DOCUMENTS

| | | |
|---|---|---|
| 1,444,975 | 2/1923 | Maine . |
| 2,705,980 | 4/1955 | Papworth . |
| 2,958,355 | 11/1960 | Young . |
| 3,026,612 | 3/1962 | Szczepanski . |
| 3,039,123 | 6/1962 | Brucker et al. ........................ 15/29 |
| 3,156,276 | 11/1964 | Petrella et al. . |
| 3,292,679 | 12/1966 | Roth . |
| 3,555,678 | 1/1971 | Agulnick et al. . |
| 3,906,682 | 9/1975 | Glasser ................................... 15/29 |
| 4,128,939 | 12/1978 | Schaeffer ............................... 30/276 |
| 4,173,051 | 11/1979 | Reid . |
| 4,211,002 | 7/1980 | Kirk . |
| 4,458,676 | 7/1984 | Pileggi .................................... 15/29 |
| 4,513,466 | 4/1985 | Keddie et al. ......................... 15/29 |
| 4,531,250 | 7/1985 | Watanabe ............................... 15/29 |
| 4,550,656 | 11/1985 | Kirk . |
| 4,667,408 | 5/1987 | Kirk ...................................... 30/123.3 |

FOREIGN PATENT DOCUMENTS 2159694 12/1985 United Kingdom ................. 99/623

Primary Examiner—Timothy F. Simone
Attorney, Agent, or Firm—Seed and Berry

[57] ABSTRACT

A water-powered peeler for vegetables and the like having an axially short housing and a domed closed end suitable for pressing against the palm of the hand of the user. An abrading tool protrudes out the opposite end of the housing. Water power drives an impeller which is connected to an axle that drives the abrading tool.

5 Claims, 2 Drawing Sheets

WATER-POWERED PEELER

DESCRIPTION

1. Technical Field

This invention pertains to hand-held peelers of the type powered by a pressurized fluid such as water.

2. Background of the Invention

Water-powered tools for peeling vegetables, fruit and the like have been disclosed in prior U.S. Pat. Nos. 4,211,022 and 3,026,612. In the former, a water-powered tool is provided with an extended handle. Water passes through the handle into a rotor and thence axially out to a rotating drum-type blade. The axle continues beyond the drum-type blade and is provided with a potato eyer on the end thereof. This type of tool requires that the vegetable be exposed within the housing to the rotating drum. Furthermore, the peeler is quite long in length, making it awkward to hold and not allowing the user to get the hand holding the tool close to the vegetable being peeled. In U.S. Pat. No. 3,026,612, the peeling tool has a motor remote from the tool and is coupled to the tool by a flexible shaft.

SUMMARY OF THE INVENTION

It is an object of this invention to provide a water-powered peeler that is compact, inexpensive to manufacture, and allows the user to position the tool closely between the user's hand and the vegetable being peeled.

It is another objection of this invention to provide a water-powered peeler that can be housed in the palm of the user's hand for a more comfortable holding position.

Basically, these objects are obtained by providing a peeler having a housing with a smooth dome holding end. A water inlet is preferably positioned on the side of the housing to rotate an impeller within the housing. An axle is driven by the impeller and is provided at its axially outer end with an abrading tool which extends axially outwardly of the housing.

In one embodiment, the peeler is provided with upper and lower axle stands. The lower axle stand is provided with a plurality of circumferentially spaced orifices for controlling the amount of water that can be passed through the housing. This then controls the speed at which the impeller rotates and thus the speed at which the abrading tool is rotated.

The tool is easy to use. Since the peeler is positioned in the palm of the hand, the user can position the abrading tool more accurately over the vegetable or fruit being peeled. Various different sizes and types of abrading tools can be snapped onto the end of the axle.

DETAILED DESCRIPTION OF THE INVENTION

Figure 1:
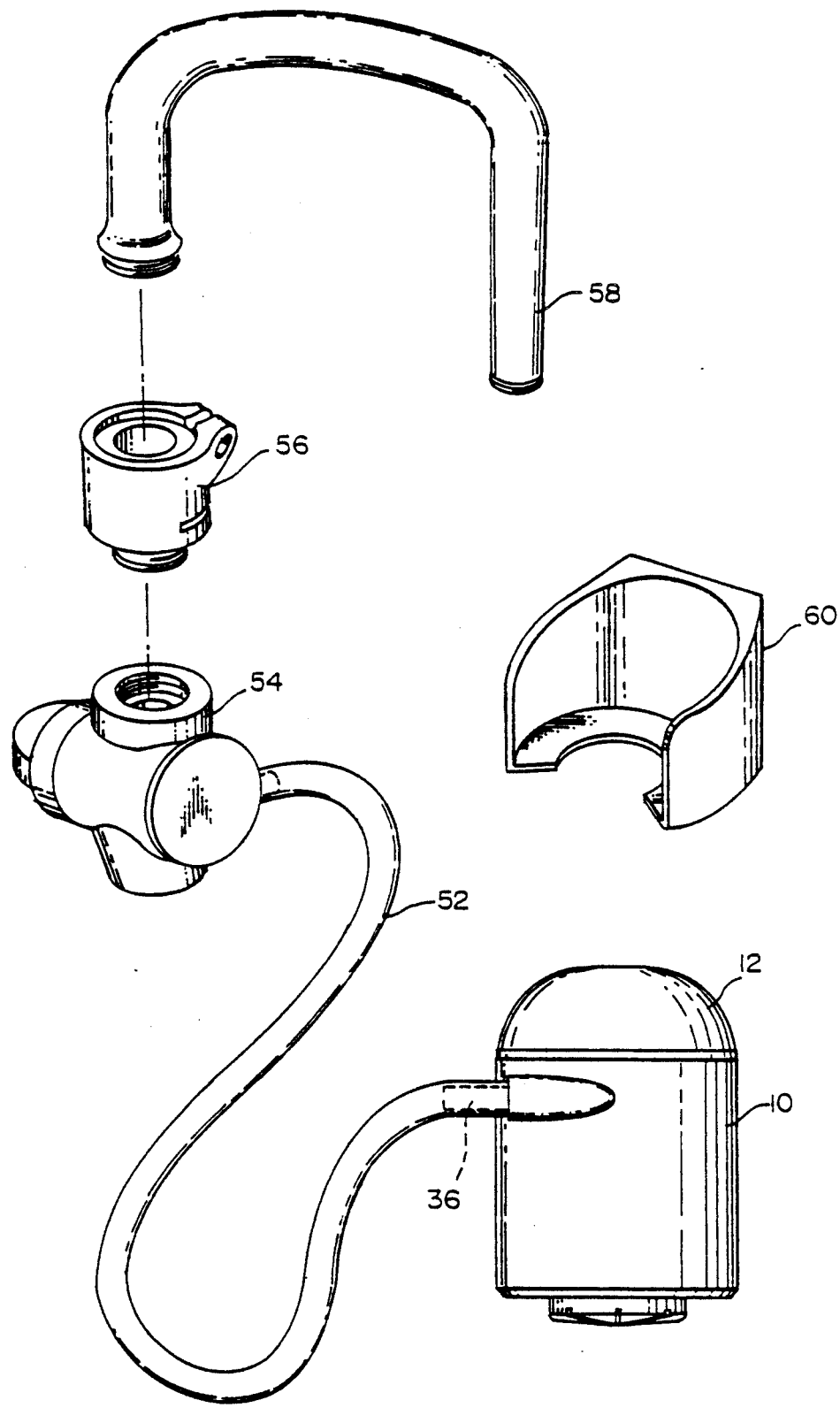
FIG. 1 is an exploded isometric showing the peeler and a coupling for connecting the peeler to a conventional home kitchen faucet.
Figure 2:
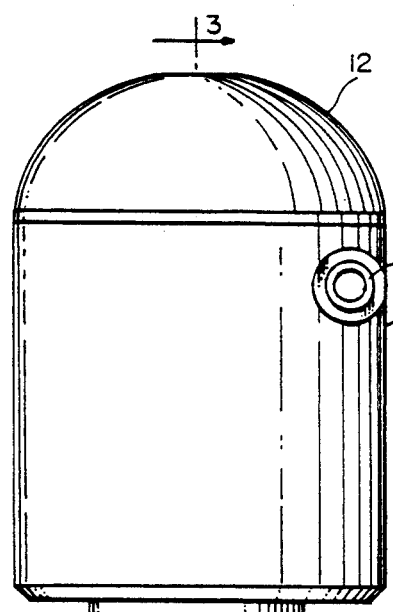
FIG. 2 is a front elevation of the peeler.
Figure 3:
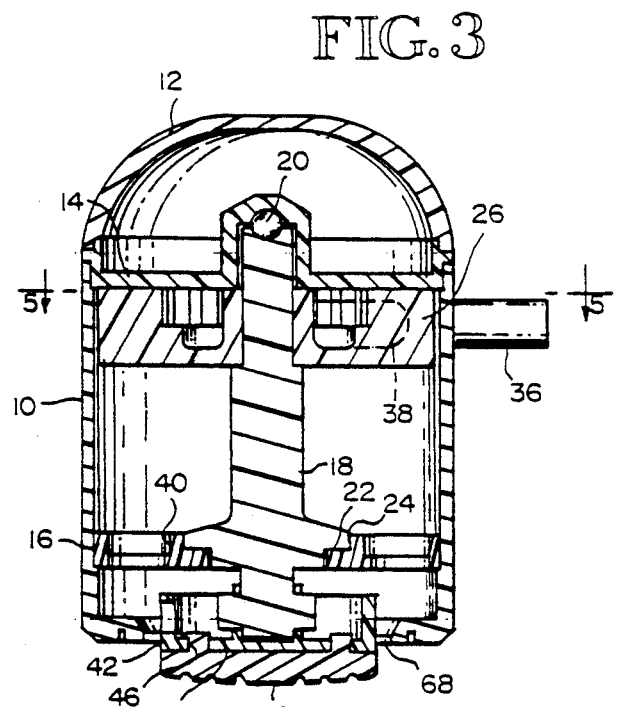
FIG. 3 is a section taken along the line 3—3 of FIG. 2.

As best shown in FIG. 3, the peeler has a housing 10 with a domed closed end 12. The size of the peeler is designed to snugly nestle into the palm of the hand with the user's fingers wrapping around to hold the housing. This allows the peeler to be held firmly but with the fingers and the palm of the hand placed closely to the vegetable being peeled for better accuracy and control of the positioning of the peeler. It also enables the amount of pressure between the peeler and the vegetable to be more accurately controlled.

The housing is provided with a top axle stand 14 and a bottom axle stand 16. The axle stands rotatably mount an axle 18. A small steel bearing 20 mounts the axle for axial thrust against the upper axle stand. A bearing surface 22 on the lower axle stand provides axial thrust bearing support for the lower end of the axle. The surface 24 on the lower axle stand provides a radial thrust bearing surface for the axle.

The domed closed end 12 and the housing 10 are sonically welded together for a watertight rigid seal.

Keyed to the upper end of the axle 18 is an impeller 26. The impeller includes a disk 28 having a central cavity 30 and a plurality of vanes 32. A key way 34 mates with a key on the upper end of the axle.

Water from an inlet tube 36 enters through a tangential opening 38 and impinges against the vanes 32. The water discharges past the vanes through the central chamber 30 and down into the housing. The water passing through the vanes causes the vanes to rotate and thus rotates the axle. Water discharging through the housing then passes through the bottom axle stand and a plurality of circumferentially spaced orifices 40. The orifices control the amount of flow that can pass through the housing controlling maximum spinning speed of the axle.

Mounted on the bottom end of the axle is a tool blade or tool holder 42. The tool holder is rigidly mounted on the axle and is provided with an outer flat surface 44. Circumferentially spaced openings 46 are provided in the surface 44. Snapped into the openings 46 is an abrading tool 48. The abrading tool can take any number of shapes, preferably being a plurality of serrated arms 50. The tool can also have an abrasive surface on a flat disk or be any other shape or size suitable for peeling a variety of fruits and vegetables. Advantageously, the tool can be snapped off the tool holder 42 for substitution of another type of tool or size of tool.

The tool can be coupled to a hose 52 that is coupled to a conventional coupling 54 of the spring-ball type used to connect air or water hoses. Coupling 54 snaps over an adapter 56 that may be threadably attached to the end of a faucet 58. In the alternative, the adapter 56 may be merely clamped on the end of the faucet, depending on the type of faucet. The coupling may be provided with a convntional water flow control valve, if desired. A holder 60 may be attached to the sink so that the tool can be positioned for storage next to or on the sink itself.

To use the tool, the coupling 54 is placed on the adapter 56 and the water turned on. The water pressure rotates the impeller, thus rotating the abrading tool. Water passes through the abrading tool, down through the housing and the orifices 40, and out the ports around the abrading tool and between the arms of the abrading tool.

Figure 4:
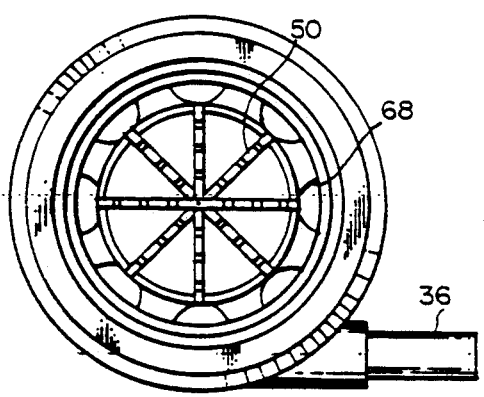
FIG. 4 is a bottom plan view.
Figure 5:
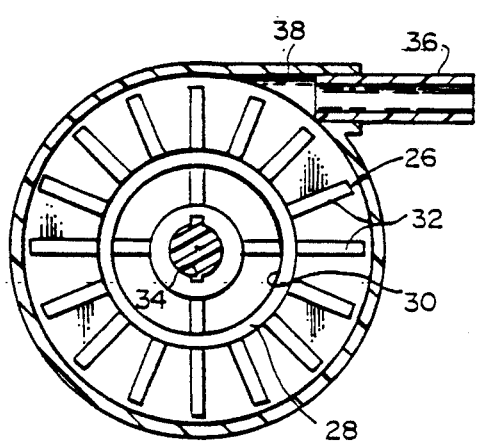
FIG. 5 is a section taken along the line 5—5 of FIG. 3.

The water discharges through an opening or a plurality of circumferentially spaced openings 68 as best shown in FIGS. 3 and 4.

While the preferred embodiments of the invention have been illustrated and described it should be understood that variations will be apparent to one skilled in the art. Accordingly, the invention is not to be limited to the specific shown in the drawings.

I claim:

1. A hand held water-powered peeler to be operated with only one hand, comprising:
   an axially short housing having a smooth domed holding end adapted to be held in the palm of one of the user's hands,
   a water inlet positioned on the side of said housing,
   a water-powered impeller within the housing,
   an axle driven by said impeller rotatably mounted within the housing,
   an abrading tool extending outwardly axially of the housing and drivingly connected to the axle, and a lower axle stand for rotatably mounting said axle, said lower axle stand having a plurality of circumferentially spaced orifices dimensioned for regulating the flow rate of water through the housing so as to regulate the rotational speed of said abrading tool.

2. The peeler of claim 1, including an upper axle stand for rotatably mounting said axle, axial and thrust bearings provided on said axle stands for positioning the axle.

3. The peeler of claim 1, said impeller including a disk having a plurality of vanes, said vanes terminating radially inwardly at a discharge chamber.

4. The peeler of claim 3, said impeller including a disk having a plurality of vanes, said vanes terminating radially inwardly at a discharge chamber.

5. The peeler of claim 1, wherein said housing has a plurality of water discharge openings disposed therein which, in combination with said orifices of said lower axle stand, regulate the flow of said water through the housing so as to regulate the rotational speed of said abrading tool.

* * * * *

UNITED STATES PATENT AND TRADEMARK OFFICE
CERTIFICATE OF CORRECTION

PATENT NO. : 5,001,973

DATED : March 26, 1991

INVENTOR(S) : David A. Holcomb

It is certified that error appears in the above-identified patent and that said Letters Patent is hereby corrected as shown below:

In column 4, claim 4, line 10, please delete "claim 3" and substitute therefor --claim 2--.

Signed and Sealed this

Fourth Day of August, 1992

Attest:

DOUGLAS B. COMER

*Attesting Officer*     *Acting Commissioner of Patents and Trademarks*